United States Patent
Hanson et al.

(10) Patent No.: US 6,413,324 B1
(45) Date of Patent: *Jul. 2, 2002

(54) WET WEATHER VISION IMPROVEMENT SYSTEM AND METHOD FOR OPEN COCKPIT RACING AND FOR OTHER APPLICATION

(76) Inventors: Brian P Hanson, 6213 Frontier Dr., Springfield, VA (US) 22150; David H. Hanson, 314 S. Fillmore St., Arlington, VA (US) 22204

( * ) Notice: Subject to any disclaimer, the term of this patent is extended or adjusted under 35 U.S.C. 154(b) by 0 days.

This patent is subject to a terminal disclaimer.

(21) Appl. No.: 09/564,206

(22) Filed: May 4, 2000

(51) Int. Cl.⁷ .............................. B08B 5/00; B08B 5/02; B60S 1/02; B60S 1/54
(52) U.S. Cl. .................. 134/37; 134/42; 15/250.001; 15/250.002; 15/250.003; 15/313; 15/405
(58) Field of Search .............................. 134/21, 37, 42; 15/313, 405, 250.001, 250.002, 250.003

(56) References Cited

U.S. PATENT DOCUMENTS

| | | | | |
|---|---|---|---|---|
| 4,803,979 A | * | 2/1989 | Fischer | 128/201.15 |
| 5,486,139 A | * | 1/1996 | Papp | 454/123 |
| 6,077,361 A | * | 6/2000 | Glenn | 134/21 |

\* cited by examiner

*Primary Examiner*—Zeinab El-Arini
(74) *Attorney, Agent, or Firm*—Sughrue Mion, PLLC

(57) ABSTRACT

A moisture and build up removal system and method which deliver air at high velocity to the surface to be cleaned and/or maintained free of moisture and build up. The system and method having a particular implementation with surfaces of helmet visors and other equipment where having unobstructed view is an important feature of the equipment.

11 Claims, 3 Drawing Sheets

WET WEATHER VISION IMPROVEMENT SYSTEM AND METHOD FOR OPEN COCKPIT RACING AND FOR OTHER APPLICATION

FIELD OF THE INVENTION

The invention concerns an apparatus for removing view-obstructing materials from a transparent surface, and is particularly suited for applications in open cockpit racing during wet-weather driving conditions, and for general applications in the fields where removal of view-obstructing substances from a surface of view enabling apparatuses (such as a visor of a helmet, or a lens of a camera) is desired.

BACKGROUND OF THE INVENTION

In open cockpit racing, typically drivers wear helmets with transparent visors. Of course these races take place outdoors, and are rarely stopped due to wet weather conditions. During the races that take place in wet weather conditions, serious vision impairment occurs, especially at lower speeds, due to a combination of rain, and resulting tire spray from the vehicle ahead, that accumulate on the visor of a driver's helmet.

Conventional solutions include chemical products such as "RainX" and "Anti-Fog" which are applied to the surface of the visor, and "Tearaways", which are just multiply layers of transparent plastic placed on the surface of a visor and torn away one layer at a time as build-up of obstructing material necessitates. In extreme wet weather conditions, a rag or towel taped to the back of the driver's hand is used to wipe off vision impairing build-up.

These conventional solutions suffer various drawbacks. For example, chemicals such as "RainX" require high speed to be effective. The "Tearaways" and the rag distract the driver because not only is the driver's vision temporarily obscured by the tearing or the wiping motion, but also the driver must let go of the steering wheel with at least one hand. This heightens safety concerns for the drivers and the spectators.

In other applications, such as television cameras which may be used to film sporting events, clear plastic covers, and umbrella-like arrangements are conventionally employed. Such conventional remedies are often inefficient, cumbersome, and not very effective especially in extreme wet-weather conditions.

SUMMARY OF THE INVENTION

The invention solves the above-identified problems by providing a system and a method capable of removing view-obstructing moisture, or build-up, from a surface by delivering air at high velocity to the surface which is exposed to the moisture and/or is susceptible to such view-obstructing build-up. The system is arranged such than the view is not obstructed at any time during the moisture or build-up removal, and requires minimal, if any, action on the part of the user of the inventive system to perform the moisture or built-up removal. While the inventive system is fully capable of removing the moisture or buildup on its own, in an advantageous embodiment of the system, it can be used in conjunction with other conventional devices, such as those mentioned above.

DETAILED DESCRIPTION OF PREFERRED EMBODIMENTS

The following is a description of the inventive system when implemented to keep the moisture/build-up off of a visor of a driver's helmet. That is, in a particularly advantageous embodiment of the inventive system, a set of small plastic nozzles are mounted to the driver's helmet directly below the bottom visor opening and aimed onto exterior surface of the visor directly at the driver's line of sight through the visor. Air at high pressure is forced through the nozzles onto the visor, thereby pushing the moisture and build-up off of the visor even under slow driving conditions.

By arranging the nozzles below the visor, the inventive system can be enhanced by application of chemical coating onto the visor, or "Tearaways", thereby even further improving visibility.

Figure 1:
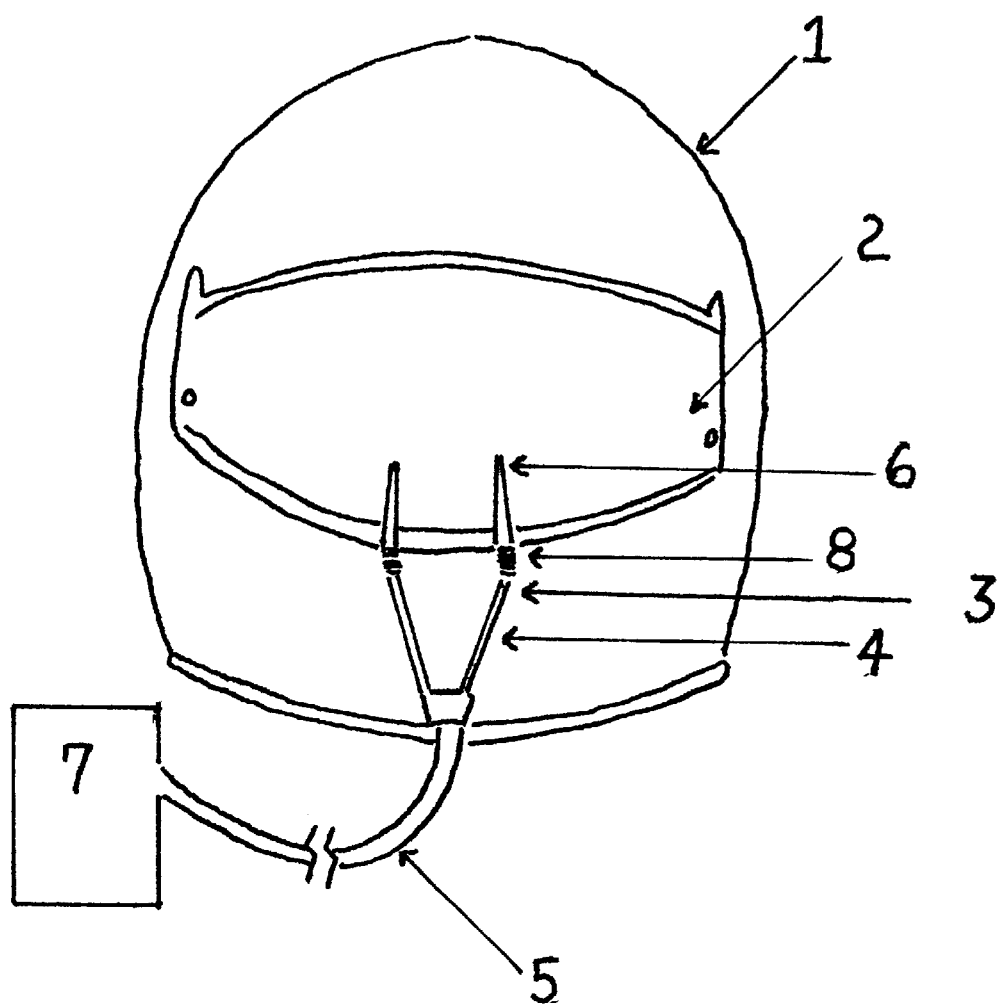
FIG. 1. Shows a frontal view of a helmet with an example of the inventive device, having an air supply tube, attached thereto.
Figure 2:
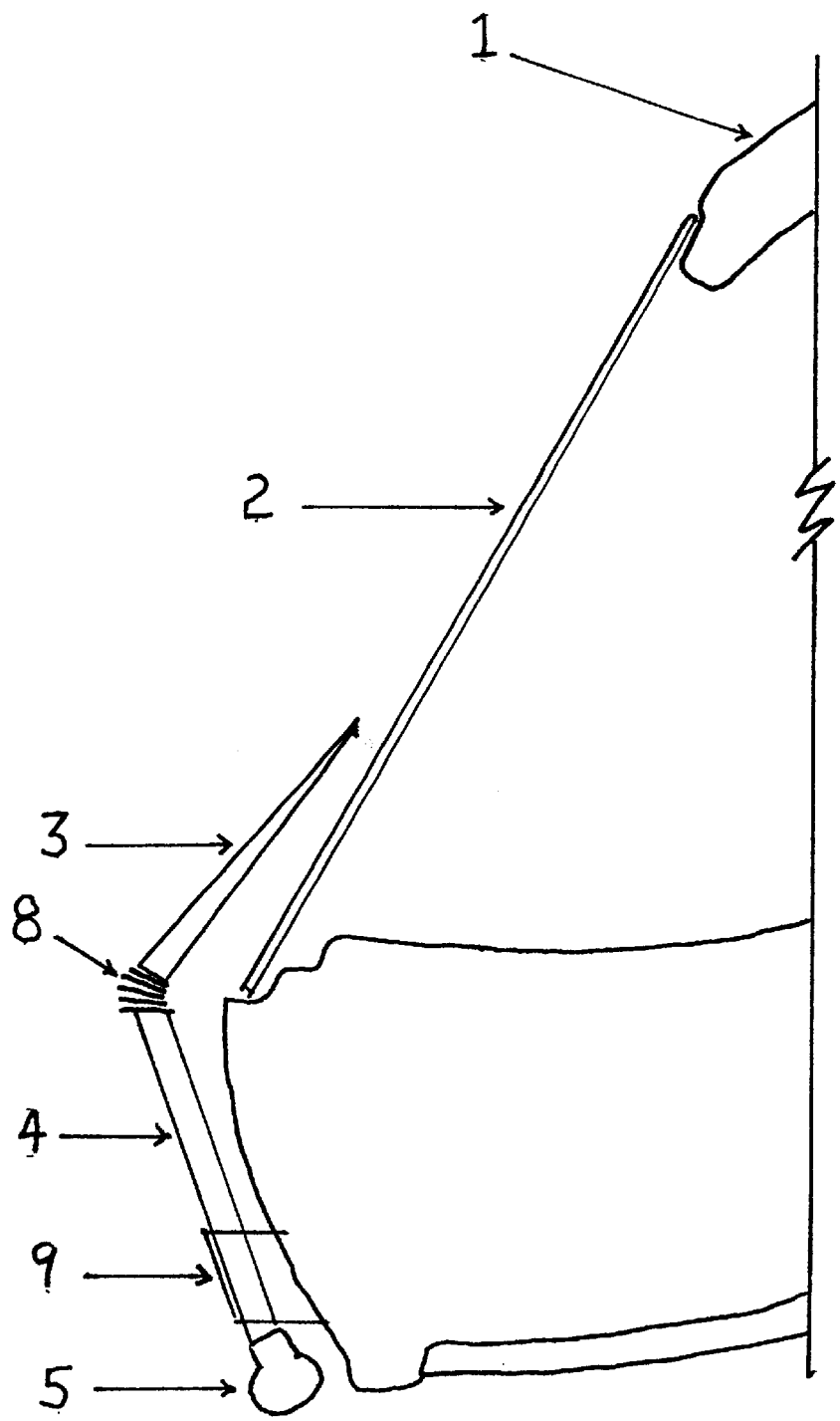
FIG. 2. Shows a cut away side view of the helmet shown in FIG. 1, and illustrates and example of the placement and intended angle of the inventive device with respect to the helmet's visor.
Figure 3:
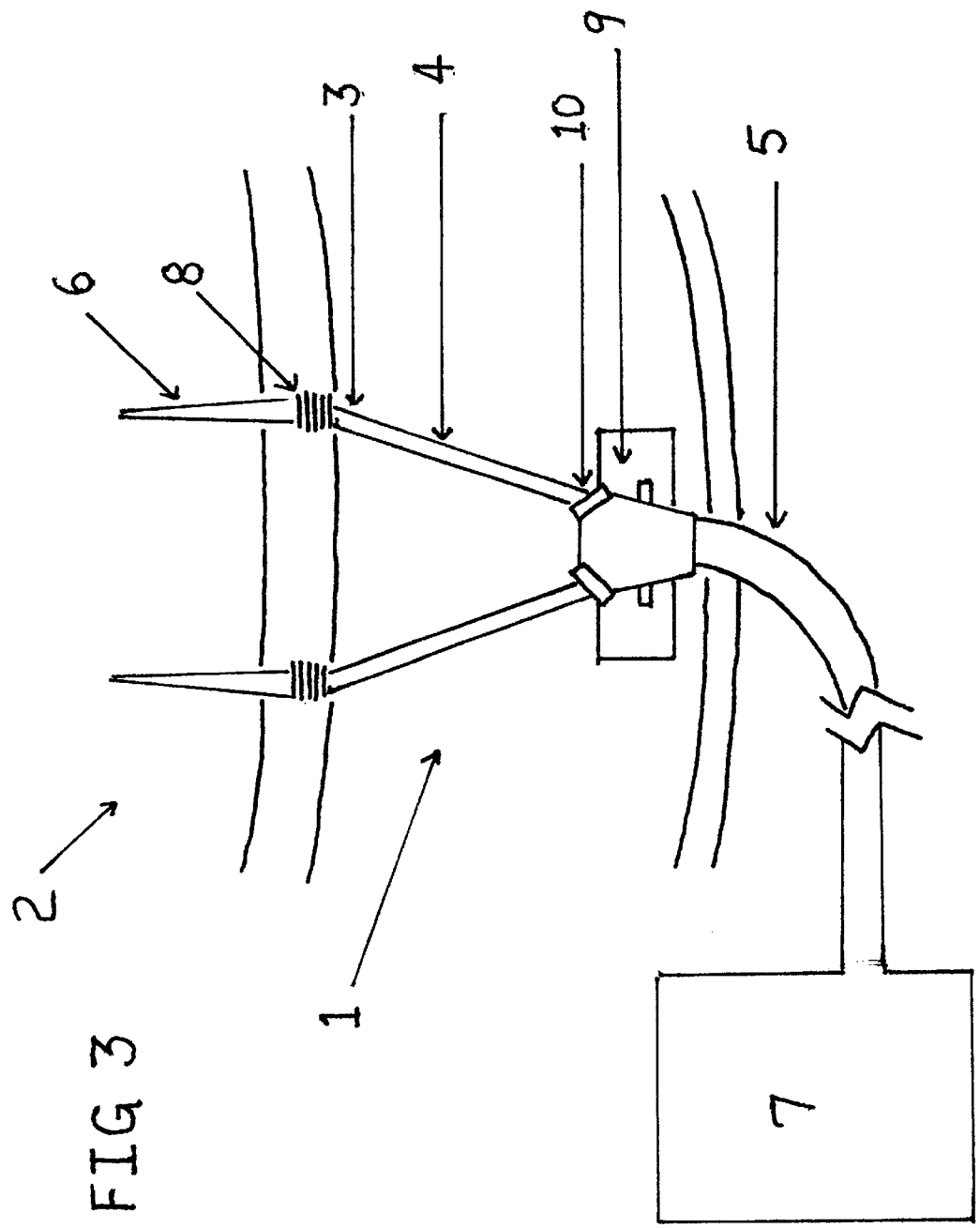
FIG. 3. Shows an example of intended attachment points and positioning of the inventive device with respect to a surface from which the moisture and/or build-up is to be removed.

FIGS. 1 and 2 illustrate an implementation of the inventive system with a visor of a driver's helmet, of course it will be appreciated the helmet shown in FIGS. 1 and 2 could be one that is used by drivers in open cockpit racing, or a motorcycle helmet. In particular, FIGS. 1 and 2 show: racing helmet 1, which is the platform for this implementation of the inventive device; visor 2 of helmet 1 which the device is intended to keep clear of moisture and build up; bendable air jet nozzles 3, which are the exit points for the high pressure air needed to clear visor 2; directional air manifold 4, which is the junction point from which nozzles 3 will protrude and to which the air is supplied; and tubing 5 which delivers air from an air supply 7 to directional air manifold 4. Air supply 7, in this example, is a source of high pressure air such as an air compressor. A more detailed view of the inventive system described above with reference to FIGS. 1 and 2 is shown in FIG. 3. In particular, FIG. 3 shows: air jet nozzles 3, which are arranged with respect to surface 11 of visor 2, and have optional air jet nozzle extensions 6, and accordion bending points 8; and directional air manifold 4 mounted onto helmet 1 using bracket 9 and clips 10.

While an implementation of the inventive system in the field of open cockpit racing has been described in detail, a skilled artisan will readily appreciate that numerous other applications, particularly those where keeping rain/water off a surface to improve visibility is desired, are possible without departing from the spirit of the invention. Such applications include:

A. Keeping rain off camera/television lenses that are filming or taping ally outdoor event.
B. Motorcycle rider's vision.
C. Auto windshield (future)
D. Off shore or lake/river power boat windshields
E. If the air supply is properly heated. this device could prevent visor fogging.

That is, surface 11 shown in FIG. 3 could be any surface, such as a visor, a rear view mirror, a camera lens, etc., with which the inventive moisture and buildup removal system comprising elements 1, 6 and 7 can be used.

We claim:

1. A moisture and build up removal system comprising:
   at least one air jet nozzle arranged with respect to a surface susceptible to moisture and build up;
   a high pressure air generator; and
   an air delivery system, connected to said high pressure air generator and said air jet nozzle, which delivers air from said high pressure air generator to said air jet nozzle,
   wherein said surface is a surface of a visor, and said air jet nozzles are placed in close proximity to said surface without obstructing any portion of said surface and said air jet nozzles are configured to deliver said air directly to said surface to push said moisture and build-up off of said surface.

2. A moisture and build up removal system as claimed in claim 1 wherein said air delivery system comprises a directional manifold connected to said air jet nozzle, and a tube connecting said directional manifold to said high pressure generator.

3. A moisture and build up removal system as claimed in claim 2 wherein said directional manifold is removably attached to said helmet.

4. A moisture and build up removal system as claimed in claim 1 further comprising a plurality of air jet nozzles, wherein said air delivery system further comprises a directional manifold which connects said jet nozzles to said high pressure generator.

5. A moisture and build up removal system comprising:
   at least one air jet nozzle arranged with respect to a surface susceptible to moisture and build up;
   a high pressure air generator; and
   an air delivery system, connected to said high pressure air generator and said air jet nozzle, which delivers air from. said high pressure air generator to said air jet nozzle,
   wherein said air jet nozzle has an accordion bending point, thereby allowing said air jet nozzle to be positionally adjusted with respect to said surface.

6. A moisture and build up removal system as claimed in claim 5, wherein said surface is a surface of a visor, and said air jet nozzles are placed in close proximity to said surface without obstructing any portion of said surface.

7. A moisture and build up removal system as claimed in claim 5 wherein said air delivery system comprises a directional manifold connected to said air jet nozzle, and a tube connecting said directional manifold to said high pressure generator.

8. A moisture and build up removal system as claimed in claim 7 wherein said surface is a surface of a visor of a helmet, and said directional manifold is removably attached to said helmet.

9. A moisture and build up removal system as claimed in claim 5 further comprising a plurality of airjet nozzles, wherein said air delivery system further comprises a directional manifold which connects said jet nozzles to said high pressure generator.

10. A moisture and build up removal system as claimed in claim 5, wherein said surface is an exterior surface of a helmet visor.

11. A method for removing, and for preventing accumulation of, moisture and/or build up on a surface, thereby keeping a view on, or through, said surface unobstructed by said moisture and/or build up, said method comprising the steps of:
    positioning at least one air jet nozzle with respect to said surface;
    generating high pressure air; and
    delivering said high pressure air to said air jet nozzle, thereby applying said high pressure air to said surface and pushing said moisture and/or build up off an area of said surface required for unobstructed viewing,
    wherein said surface is a surface of a visor, and said positioning step further comprises placing the at least one jet nozzle in close proximity to said surface without obstructing any portion of said surface.

* * * * *